3,446,650
May 27, 1969

3,446,650
COATING MATERIAL AND METHOD OF APPLICATION
Richard L. Smith, Atlanta, Ga., assignor to Lockheed Aircraft Corporation, Los Angeles, Calif.
No Drawing. Filed Sept. 20, 1965, Ser. No. 488,739
Int. Cl. B05c 7/00; B44c 1/36
U.S. Cl. 117—62                    17 Claims

ABSTRACT OF THE DISCLOSURE

The invention provides a microbial corrosion and penetration inhibiting coating for metal surfaces subject to contact by turbine fuels and other petroleum products which may contain incidental amounts of water and micro-organisms which subsist on the water and fuel and corrosively attack the metal surfaces, such microbial attack including the penetration of polymerized coatings of the metal surfaces if so coated. More specifically the invention provides a polymeric plastic, including polyurethane and Buna-N, containing in admixture a water soluble systemic toxin of an acid additive salt of rosaniline in which at least one substituted ethylamine group contains the cation of the salt, including brilliant green and malachite green.

---

This invention relates to coating compositions, and is more particularly concerned with a product for and process of inhibiting the growth of micro-organisms and corrosion on metal surfaces. The present invention has particular application to the prevention or reduction of microbial induced corrosion within petroleum product containers, such as the fuel tank of turbine powered aircraft, as well as it provides a visual indication of corrosion should such occur.

In the past, turbine powered and jet aircraft have been plagued with an accumulation of bacteriological sludge in the fuel tanks. This material collects in the water layer at the bottom of the fuel tank and, when vibrated, becomes entrained in the fuel, causing plugging and malfunctioning of the fuel probes, the fuel filters and, on at least one occasion, has caused the flame-out of an engine. Furthermore, in some instances, corrosion has been so severe as to necessitate the replacement of structural members of the aircraft. Indeed, bacterial sludge has eaten holes completely through the integral fuel tank of an aircraft wing.

The sludge appearing in hydrocarbon or petroleum turbine fuels was first believed to be a simple contamination; however, upon microscopic examination of the sludge, it was shown to be made up of a variety of bacteria, algae, fungi, yeast growths and amoeba. Studies have shown that these micro-organisms are not only capable of living in the presence of turbine fuel, but use the fuel and, if the lining is Buna-N, the Buna-N tank lining, itself, for nutrients. The micro-organisms live in the water which is present in the tanks and feed on the organic matter.

The micro-organisms found living in turbine fuels range in size from approximately 0.2 micron at its smallest dimension to approximately 10 microns or more in length. Reproduction and growth can be very rapid and appears to be optimum in tropical or warm climates. These bacteria reproduce by division in as little as 20 minutes under ideal conditions. The fungi grow in filaments or threads which branch off in all directions and, in addition, produce spores.

The problem of microbial induced corrosion was not present in conventional propeller aircraft due to the fact that such propeller aircraft utilize gasoline rather than a kerosene type of fuel. The kerosene type fuel is quite palatable to the bacteria and fungi. Apparently, saline or brackish water, as well as surface active agents and metallic ions, such as iron rust, promote the growth of these micro-organisms and promote the corrosion of the fuel tank.

On the other hand, micro-biological contamination of turbine fuel is quite common since water generally separates from fuel quite readily and it has been common practice to expose the turbine fuel to water deliberately for reasons of economy and expediency. Furthermore, it has become common practice to off-load fuel from turbine powered aircraft in the storage tanks in various places and thereby intermix fuel from a number of different sources. Large storage tanks are usually provided with water layers so as to prevent the seepage of the fuel from the tank. Also, water is frequently used as a divider between different types of petroleum products transported through pipe lines. It has been common practice for tankers to pump seawater into the fuel tanks so that the tanks remain full at all times to provide ballast and to displace the explosive vapors from the tanks.

Water is also introduced after the fuel is in the aircraft by condensation in the tank when the aircraft descends from an altitude. This water, even though being sterile, replenishes the water necessary to promulgate the micro-organisms already in the tank.

Surface active agents are often introduced into fuel during the refining process. Others get into the fuel from old additive-containing residues in fuel farms and bulk storage tanks. These surfactant materials emulsify water in the fuel and make it impossible to separate the water by normal means. The presence of the surfactants will often double or triple the amount of water which passes through filters. They contribute to the failure of organic coatings in the tank by increasing the wetting ability of the water. This reduction in interfacial tension between water and fuel also increases the availability of the hydrocarbon nutrient to the micro-organisms.

Iron rust and other metallic ions present in the turbine fuel contribute to the action of the micro-organisms and promote galvanic corrosion, water retention and organic coating breakdown. Iron rust is quite common in fuel since much of the fuel handling equipment as well as pipe lines and tanks are made from uncoated mild steel.

While the mechanism of the micro-organisms in the fuel tank is not completely understood, one theory is that the iron rust particles attract and hold water, thereby providing an environment for the accelerated growth of the micro-organisms in direct contact with a coating in the inside of the tank. Organic acids produced by the metabolic activity of the bacteria chemically react with the iron rust which, in turn, deteriorates and penetrates the coating. Once the coating is perforated, general environmental corrosion occurs.

Still another theory suggests that the micro-organisms promote the electro-chemical corrosion process in that the electro-chemical system involves a flow of electricity within small primary cells, the current passing from the metal to an electrolyte to cause the metal to go into solution in the electrolyte. At the cathode area, where the current passes from the liquid into the metal, hydrogen is formed. This hydrogen remains on the metal surface and eventually builds up sufficient opposing potential to polarize the cell. If the hydrogen is removed by reaction with oxygen or some other depolarizer, corrosion resumes at an accelerated rate. Many bacteria, as a result of their normal metabolism, produce reversible oxygen/reduction systems and organic compounds capable of utilizing the hydrogen so produced.

The problem of attack by micro-organisms of the metal defining the fuel tank of an aircraft has long been recognized and efforts have been made to obviate the problem; however, heretofore, to the best of my knowledge, no one has devised a practical, inexpensive, yet effective way of reducing the growth of such micro-organisms or their attack on the metal.

Briefly described, the present invention includes incorporation, with the polymeric material normally used for coating or lining the surfaces exposed to turbine fuel, a systemic toxin which is insoluble in the fuel and has as its major constituent an acid additive salt of rosaniline in which at least one substituted low carboxylamine group contains the cation of the salt. This compound is represented by the following structural formula:

$$R \cdot N \langle \rangle = C - \langle \rangle N \cdot R_1$$

wherein R and $R_1$ represent hydrogen, dimethyl, diethyl, propyl or butyl group in which at least one such group has a cation capable of rendering the compound soluble in water and compatible with the polymeric material with which it is employed.

The systemic toxin described above prevents the micro-organisms from penetrating the plastic lining of the fuel tank and therefore retards the growth of the micro-organisms and retards or prevents microbial induced corrosion of the metal. The systemic toxin employed, according to the present invention, also has a vivid color and tends to migrate to the point where the corrosion takes place whereupon it then further functions as an indicator by changing color to indicate the presence of the corrosion.

Accordingly, it is an object of the present invention to provide a coating composition which will materially retard or prevent the attack by micro-organisms on the metal over which the coating composition is applied.

Another object of the invention is to provide a coating composition which, when corrosion occurs, will indicate by a change in color the location of the corrosion.

Another object of the present invention is to provide a process for retarding the growth of micro-organisms within the fuel tank of aircraft.

Another object of the present invention is to provide a process for preventing microbial attack on the interior of fuel tanks of aircraft.

Another object of this invention is to provide a method by which the systemic toxin may be re-impregnated or post-impregnated into the lining material of an already lined fuel tank.

Another object of the present invention is to provide a coating material which is inexpensive to manufacture and which will reduce microbial attack and thereby inhibit corrosion induced by such microbes.

Other objects, features and advantages of the present invention will become apparent from the following detailed description of various embodiments of the invention.

In the detailed description which follows, I use the term "turbine aircraft" which is intended to include both pure turbojet aircraft and turbo-prop driven aircraft.

As pointed out above, micro-organisms facilitate the corrosion of metal through direct enzymatic attack, depolarization of active sites, and through the production of corrosive metabolic products. It is therefore seen that the critical point in microbial induced corrosion within fuel tanks of turbine aircraft involve the initial failure of the coating along the interior of the tank surface. Heretofore, Buna-N coatings have been utilized for coating the interior of the tanks of turbine aircraft; however, it will be remembered that the micro-organisms found in turbine fuel subsists, to a certain extent, on this coating and hence soon penetrate the coating. Polyurethane coatings have also been employed for lining the interior of a fuel tank of a turbine airplane. The failure of polyurethane coatings appears to be a mechanical penetration by the micro-organisms rather than a metabolic attack thereon. At any rate, two mil coatings of Buna-N are penetrated in four days by the micro-organisms and, under the same conditions, polyurethane coatings are penetrated in eight days. Still other polymeric materials suggest themselves for use as coatings on the interior of turbine aircraft fuel tanks. Such polymeric materials include polyesters, epoxies, polyvinyl-chloride, vinyl acetate-vinyl chloride copolymers, polyamides, furanes and amides. Still other polymeric materials may suggest themselves to those skilled in the art.

The present invention contemplates the incorporation with such coating material of a rosaniline salt, the structure including three benzene rings and two amine groups. For example, dyes known in the trade as "brilliant green" or "malachite green" are particularly suitable for use as systemic toxins. These systemic toxins are preferably incorporated with the polymeric material prior to the time the polymeric material is sprayed or otherwise applied to the interior of the fuel tank, the systemic toxin being uniformly distributed throughout the polymeric material. The quantity of systemic toxin employed is sufficient to reduce, if not eliminate, penetration of the coating, thus applied to the interior of the fuel tank, by the micro-organisms found in the fuel. Usually from approximately 0.1 percent to approximately 0.5 percent, by weight, systemic toxin is employed in the polymeric material; however, as little as .01 percent, by weight, of the systemic toxin is effective and as much systemic toxin may be utilized as will not affect adversely the film properties of the polymeric material.

Preferably, the systemic toxin is dissolved in a solvent compatible with the polymeric material. This solvent is then incorporated into the polymeric material in its A stage and prior to the spraying of the material onto the metal surface to be coated. It will be understood, of course, that the systemic toxin may be dispersed rather than being dissolved in the polymeric material employed as the coating since such systemic toxins appear to form solid solutions with the resins.

When coated on the surface of metal defining the fuel tank of a turbine aircraft, the systemic toxin of the present invention serves a number of functions. The structure of the systemic toxin is such that it tends to migrate to any local cell action and there tends to coat or mask the cathode and thereby reduce corrosion due to electrolysis or local action; such corrosion capable of arising or coming from conditions in the tank forming structure that is coated rather than penetration of the coating as explained. Furthermore, the systemic toxin of the present invention is oxidized, giving up its central carbon and thus producing the benzidine derivative which is colorless and indicates the presence of this corrosion. Of primary importance, of course, is the fact that the presence of the systemic toxin in the coating retards the penetration of the coating by the micro-organisms and actually reduces the growth of the micro-organisms in the fuel system.

A better understanding of the present invention will be had by reference to the following specific examples thereof:

TANK APPLICATION

Brilliant green containing, as its major constituent, tetraethyl-p-triphenyl diamine sulfate was incorporated with 2-ethyoxyethane acetate to saturation. Only approximately 5 percent, by weight, of the brilliant green dissolved in the ethoxyethylene acetate. This solution was then admixed with the conventional resin component of the two-part polyurethane-solvent system employed for coating the interior of the tank of a turbine aircraft. Sufficient brilliant green-ethoxyethyl acetate was admixed with this resin component to yield a final mixture containing 0.2 percent by weight brilliant green. The mixed material was then sprayed to create a layer on the interior of a simulated tank of a turbine aircraft of approximately 1 mil thickness. This tank was then filled with standard turbine fuel, water and micro-organisms and periodically agitated to simulate flight use. A similar tank was prepared using this same coating system without this biocidal additive and subjected to the same tests. After one year the tank containing the brilliant green dye was free from defects while the untreated tank showed numerous small coating imperfections which exposed the bare metal base.

LABORATORY TESTS

In the tests described hereinafter, the following rosanalines were tested for use in polyurethane coatings:

(1)
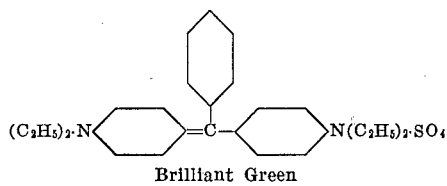
Brilliant Green (2)
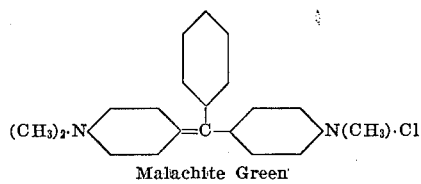
Malachite Green (3)
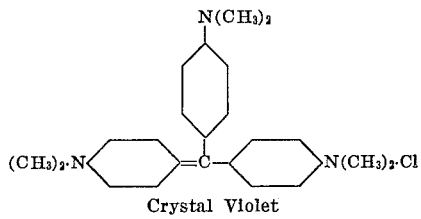
Crystal Violet (4)
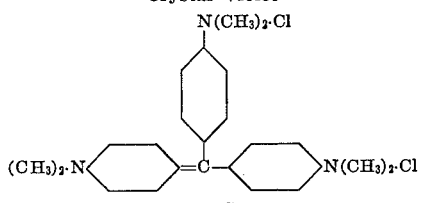
Methyl Green (5)
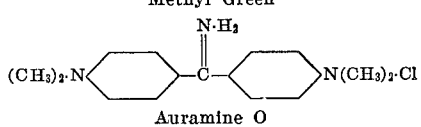
Auramine O (6)
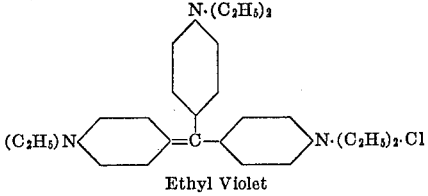
Ethyl Violet The analysis took into consideration the specific configuration of the molecule, the reactive groups, the solubility in fuel and water and the Hammett partition coefficient. A second order consideration was that the ultimate additive material should offer a color contrast to any sulphuric acid anodized surface to which the polyurethane was to be applied and not render the coating opaque.

INITIAL SCREENING

The initial screening test was made with a mixed microbial culture originally from Ramey Air Force Base. Standard petri dishes were inoculated with a homogenized mixture of micro-organisms. In one group of the petri dishes a potato-dextrose-agar culture medium was placed. In another group of the petri dishes a nutrient agar culture medium was placed. The dextrose agar favored the growth of fungi and yeasts and the nutrient agar exhibited preferential growth rates for the bacteria. For each of the rosanilines listed above, agar solutions thereof containing 1 percent, .1 percent, .01 percent and .001 percent by weight rosaniline were made. In addition, a blank agar solution containing no additive was prepared for each of the media. These agar-rosaniline solutions were then added in varying amounts to the petri dishes which were then placed in an incubator for four days at 78 degrees F.

The malachite green and brilliant green were both found to be effective as biocides for the mixed cultures in both media at a concentration as low as .01 percent but not at .001 percent. The other rosanilines at 1 percent were found to be less effective in inhibiting growth of the cultures.

MINIMUM EFFECTIVENESS OF BRILLIANT GREEN

To establish specifically the minimum effective concentration, a cylinder of nutrient agar was prepared by casting the agar in a glass tube of ½-inch inside diameter. The length of the cylinder was 14 inches. After hardening and while still in the glass tube, a layer of .5 percent brilliant green in water was added as a supernatant. This resulted in a diffusion gradient of the biocide in the agar being established linearly. This medium was then inoculated and the critical concentration could be determined using colorimetric techniques. This concentration was .003 to .008 percent, variable with species. The test was conducted by placing the rod of agar after diffusion into a culture dish containing sterile water. The water covered ⅓ of the diameter of the rod. The water was then inoculated with a mixed culture homogenate so that all organisms represented had equal opportunity for attachment to the agar. During the test period of six days the amount of diffusion of the brilliant green from the agar tube was insignificant and could not be detected colorimetrically.

PANEL TESTS

Test panels were prepared by coating aluminum alloy panels with polyurethane containing .01 percent by weight brilliant green. Other test panels were prepared using the aluminum alloy coated with Buna-N containing .01 percent by weight brilliant green. These panels were then immersed in an active culture of micro-organisms in a salt/fuel environment. The panel orientation was such that it intersected the water layer, the water-fuel interface, the fuel layer and the fuel-air interface. Mild aeration was used on an intermittent basis to simulate the fuel tank environment and to prevent the system from becoming anaerobic.

At the end of a twelve-month exposure period no attack or attachment of the micro-organisms to coated surfaces had occurred. Micro-examination of the surfaces found them to be intact, free from blisters and other imperfections. A slight but observable leaching of the brilliant green in the area of the panels immersed in the water layer was apparent.

FILM TESTS

In the free film test (membrane) films were made from Buna-N containing .01 percent by weight brilliant green. Other films were produced from polyurethane containing .01 percent by weight brilliant green. Still other films were prepared using malachite green in place of the brilliant green. Control films were also produced. The films were approximately 1.5 mils thick and were sealed across the ends of glass tubes. Inoculated Bushnell-Haas medium and JP-4 fuel, which is a conventional turbine fuel, were placed inside the tubes. The tubes were then respectively placed through a hole in the stopper of a wide-mouth bottle which contained sterile JP-4 fuel and Bushnell-Haas solution. Prior thereto, the outside of the tubes with the test films at the lower end were sterilized with alcohol and the wide-mouth bottle was sterilized in an autoclave.

The JP-4 fuel and the Bushnell-Haas solution in the outer bottle were sterilized by filtering through a 0.45 millipore filter. The tubes were adjusted so that the test films were at the interface of the JP-4 fuel and Bushnell-Haas layer of the outer bottle.

Under these test conditions it has been found that the Buna-N containing .01 percent brilliant green in a dupli- and polyurethane film with no toxin was penetrated in eight days. These tests were repeated in this study with concurrent results. The membranes of polyurethane and Buna-N containing .01 percent brilliant green in a duplicate test had not been penetrated in ninety days when the test was discontinued.

ENVIRONMENTAL TESTS

In addition to the specific testing for biocidal inhibition, a series of standard environmental tests were also conducted to determine whether the systemic toxins incorporated in polyurethane had a detrimental effect on the coating material itself. The results of the tests on polyurethane containing brilliant green are listed in Table I:

Table I

| Test: | Results |
| --- | --- |
| Viscosity | Unchanged. |
| Application life | Do. |
| Cure time | Do. |
| Resistance to water | Do. |
| Resistance to salt water and fuel | Resistant. |
| Fuel contamination | No contamination, no tarnish. |
| Simulated microbial by-products | No coating loss. |

The tests described above have demonstrated that the brilliant green and malachite green are particularly effective in preventing degradation of Buna-N and polyurethane coatings in the presence of microbes typical of those in fuel systems. During the life of the tests no organisms showing resistance to these toxins were encountered, neither have they developed in long-term exposures to rapidly proliferating populations.

The polyurethane used in these tests was a commercial product marketed by the Products Research Corporation as No. PR1560 as a protective coating for in the interior surfaces of aircraft integral fuel tanks to prevent corrosion. It can be described as a two-part system consisting of a toluene diisocyanate plus a diol and such other solvents and extenders as to give the desired film properties. Its general physical characteristics are described in Table II:

Table II

| | |
| --- | --- |
| Color: | |
| Part A | Clear. |
| Part B | Translucent Yellow. |
| Mixing ratio | 1:2 by volume (part A: part B). |
| Nonvolatile content | 42%. |
| Viscosity: Ford No. 4 cup | 15 sec. @ 75% F. |
| Flash point | 85% F TOC. |
| Weight | 10.0 lbs./gal. |
| Coverage | 350 sq. ft./gal./mil approx. |
| Recommended film thickness | 0.8 to 1.0 mil. |
| Application life | 8 hrs. @ 75° F., 50% RH (relative humidity). |
| Drying time (dry to handle) | 3 hrs. @ 75° F., 50% RH. |
| Cure time (ultimate) | 14 days @ 75° F., 50% RH or 2 days @ 75° F., 50% RH followed by 24 hrs. @ 120° F. or 2 days @ 75° F., 50% RH followed by 8 hrs. @ 140° F. |

In addition to the tests described above, other tests were run on brilliant green as an additive to Buna-N rubber and in polyvinyl chloride and epoxy systems. In each case when a toxin according to the present invention was added to the coating material, resistance to penetration by microorganisms was achieved. The same concentration of brilliant green was effective as proved effective in the polyurethane system.

MICRO-ORGANISMS

The culture of micro-organisms used in this test series was from the refueling facility at Ramey Air Force Base, Puerto Rico. Other studies have shown that the organisms indigenous to this facility are typical of those which have caused contamination throughout the world. Several of the principal organisms were isoloated and are described as follows:

*Clostridium multifermentans.*—This bacteria is characterized by slender rods with rounded ends. Spores as present moderately swell the cells. Agar colonies are oyster white, opaque dry, and irregular. The agar is characteristically cracked by the profuse gas production. This organism shows strong diastatic action on starch.

*Clostridium sp.*—This is a smaller organism than above (2–3 microns in length). Spores are readily formed and cause slight swelling of the organism. The agar colonies are clear, white, glistening and without a reaction area. Gas production is not evident and agar cracking does not occur.

*Aspergillus sp.*—This organism shows very moderate growth on agar media. It is a pale white, even in old cultures. The characteristics are extremely long strands of conidia with a chain length of hundreds of spores. The hypa are distinct in having many large vacuoles randomly dispersed along the mycelium. The conidiophore is greatly reduced and the vesicle is vestigial.

*Pullularia sp.*—Mature colonies are white and fleecy having the appearance of talcum powder. When young they are amorphous and smooth. Microscopically, this organism is very yeastlike in appearance with the spores forming directly on the mycelium. The mature spores are four or five times the diameter of the mycelium. In most cells the nuclei are clearly apparent.

*Hormodendrum sp.*—Typical tan colonies on agar as well as on fuel. Conidia occur as moderately long chains on a reduced conidiophore without an apparent vesicle. Specimen in this study have a characteristic pear-shaped spore. This organism grows profusely on all media tried as well as in fuel.

*Fungi sp.*—This specimen can only be identified as a fungus. This organism could not be induced to develop spores even under dehydration or thermal stress. Since the classification of fungi is descriptive of the method of spore production, all attempts at identification failed by definition. This organism is characterized by the ready formation of oogonia. The colony on agar was a pearly white efflorescence easily maintained vegetatively.

*Aspergillus sp.*—This is a pale yellow fungus growing moderately well on agar. Fruiting bodies appear quite yellow as compared to Hormodendrum and is easily identified microscopically. Very old colonies have a dark tan appearance with bright yellow spots of conidiophores. The conidiophore is four times the diameter of the mycelia and the vesicle is lobate and massive. The stigmata are short and the conidia are quite round.

*Aspergillus sp.*—This is a pure white aspergillus which appeared as a single colony in one of the fuel dilutions subsequent to the isolation of the original organisms of this study. The colonies were all pure white as were the conidia.

Therefore it is seen that in varying degrees, chemicals having the following structural formulae when admixed with a polymeric material are effective to prevent or inhibit the growth and penetration of a film of the polymeric material:

$$RN\langle\rangle=C(\langle\rangle)\langle\rangle NR_1$$

in which either or both R and R$_1$ represent $$H_2, (CH_3)_2, (C_2H_5)_2, \langle{}^{C_2H_5}_{CH_3}, (C_3H_7)_2, \langle{}^{C_3H_7}_{CH_3}, \text{ or } {}^{C_3H_7}_{C_2H_5}$$

to which a cation of a salt is attached. Such cations are preferably halides, sulfates, or carbonates. The systemic toxin may be uniformly distributed in the polymeric material by dissolving the same in a solvent for the polymeric material and then adding it to the polymeric material, prior to the spraying of the material on the surface to be coated. Also, the systemic toxin may be ground with the polymeric material in a ball mill, if desired.

In the resulting polymerized coating or film on a metal surface, the systemic toxin should constitute from approximately .01 percent to .5 percent by weight of the film. It will be understood, however, that as much systemic toxin as desired may be incorporated with the film, provided it does not adversely affect the resulting film.

By migration and by changing color, these systemic toxins also indicate the specific location of the corrosion, if any corrosion of a metal coated with my coating composition occurs. Hence, by visual inspection, the location of corrosion in such fuel tanks is readily ascertained.

It has been found that after extensive water immersion of polyurethane type coatings containing the systemic toxin some leaching of the toxin occurs whereby there is some loss of color; such toxin leaching not being noticed with the Buna-N tank lining materials. To counteract this leaching, it has further been found that the systemic toxin can be re-impregnated into certain of the installed tank lining materials from solution, as well as post-impregnation of the systemic toxin from solution can be accomplished with certain installed tank lining materials that do not contain such systemic toxin before application.

The systemic toxin is placed into solution with a solvent that is compatible with the tank lining material; such solution then being sprayed onto the tank lining or coating or used as a flushant in the coated tank. With the exception of Buna-N coating material it has been found that the toxin in solution is satisfactorily adsorbed by the coating material while the toxin solvent evaporates or can be washed off after a period of time in the event the time necessary for complete solvent evaporation is not taken.

This post- or re-impregnation process is most advantageous as it provides an easy and efficient method to obtain the benefits of fuel tank coatings with systemic toxin with those installed tank coatings having no toxin or suffering from leaching; the main advantage being that the toxin can be introduced without the complete stripping of the coating from the tank and a complete re-coating operation with a coating composition containing a systemic toxin.

Effectiveness of this process for post- or re-impregnation of the systemic toxin into installed coating materials was accomplished by tests in which 5 percent by weight of brilliant green was placed in solution with methyl alcohol (methanol); the use of methyl alcohol as the solvent being preferred since this is the flushing liquid used in lined or coated fuel tanks after the cleaning thereof. Thus, the use of methyl alcohol as the systemic toxin solvent is consistent with the normal procedure to clean lined or coated fuel tanks, although it is recognized, as stated above, that any systemic toxin solvent may be used that is compatible with the coating material.

Panels coated with each of polyurethane and Buna-N were immersed in the solution for various periods of time; the time periods being 30 seconds, one minute, two minutes, ten minutes, thirty minutes, and two hours. After immersion, the panels were allowed to dry in air at 74 degrees F., or in other words at room temperature. In all panels, penetration had occurred to saturation in ten minutes.

It was observed, however, that after ten minutes immersion in the solution that hardening of the Buna-N coating had occurred such that the Buna-N coatings were significantly harder and more brittle than the untreated or non-immersed panels. On the other hand, the polyurethane coatings remained unchanged in their physical properties after impregnation, as well as immersion for the longest period (two hours) left the coatings unaffected. Microscopical examination of the immersed panels showed that the biocide or systemic toxin was evenly distributed throughout the coating on all panels having an immersion time of ten minutes or longer.

Spray application of the systemic toxic in solution to fuel tank coatings also produces some impregnation of the toxin into the coating; the one exception again being the Buna-N coating, such impregnation application for Buna-N coating material being unsatisfactory due to hardening of the coating. Accordingly, it must be recognized that for a satisfactory combination of Buna-N fuel tank coating material with a systemic toxin, the toxin should be added to the Buna-N coating material before application to the fuel tank to avoid undesirable, although not inoperatively critical, hardening of the Buna-N coating material. This quirk of Buna-N coatings becoming hardened upon post- or re-impregnation of the systemic toxin after installation of the Buna-N coating is not believed to be too material since, as pointed out above, leaching of the systemic toxin due to contact or immersion with water does not occur as with the other types of fuel tank coating materials.

As for the post- or re-impregnation of the systemic toxin in fuel tank coating material by spraying, it is of course to be realized that the amount and quantity of penetration of systemic toxin into the coating material may not be as great as will occur from using the toxin in solution as a flushant or to incorporate the toxin in the coating material prior to application in the tank. However, if a sufficient number of spray applications are made, the amount of toxin within the coating material may become saturated as occurs by immersion.

While I have described my coating compositions as applied to fuel tanks of aircraft, other uses such as linings for stationary storage tanks and protective coatings for various surfaces will suggest themselves to those skilled in the art.

It will be obvious to those skilled in the art that many variations may be made in the embodiment chosen for the purpose of illustrating the present invention without departing from the scope thereof as defined by the appended claim.

What is claimed is:

1. A polymeric coating material in which is present in an amount sufficient to inhibit the penetration of the coating material by micro-organisms contained in liquids which contact the coating material, an acid additive salt of rosaniline in which at least one substituted ethylamine group contains the cation of the salt.

2. The coating material of claim 1 in which the additive is a rosaniline selected from the group consisting of brilliant green and malachite green.

3. A coating composition comprising a polymeric material suitable for use in coating metal surfaces exposed to microbial attack to protect the same from corrosive attack and a systemic toxin for reduction of microbial penetration of said polymeric material and which is soluble in water and insoluble in turbine fuel, said systemic toxin having as its major constituent an acid additive salt of rosaniline in which at one lower carboxylamine group thereof contains the cation of the salt, said systemic toxin having the following structural formula:

$$R\cdot N\cdot \langle\phantom{x}\rangle =C-\langle\phantom{x}\rangle NR_1$$

wherein R and $R_1$ represent hydrogen, dimethyl, diethyl, propyl or butyl groups in which at least one group has a cation capable of rendering the systemic toxin soluble in water and compatible with said polymeric material.

4. The coating composition defined in claim 3 wherein said ratio of systemic toxin to polymeric material is such that in a coating resulting from the coating composition contains up to .5 percent by weight systemic toxin.

5. The structure wherein the coating composition of claim 3 is adhered to a metal surface and in a dried condition, the systemic toxin being contained in the polymeric material.

6. In a fuel tank of a turbine powered aircraft, a lining on the interior thereof comprising a polymeric material selected from the group consisting of polyurethane and Buna-N, and a systemic toxin selected from the group consisting of brilliant green and malachite green, said systemic toxin being uniformly distributed throughout the polymeric material and being in an amount sufficient to be effective for inhibiting microbial penetration of the lining as well as corrosion on the inner surface of the tank.

7. In a fuel tank of a turbine powered aircraft, a lining on the interior thereof comprising a polymeric material selected from the group consisting of polyurethane and Buna-N, and a systemic toxin selected from the group consisting of brilliant green and malachite green, said systemic toxin being uniformly distributed throughout the polymeric material and being in an amount sufficient to be effective to result in oxidation of the systemic toxin upon the presence of corrosion between the inner surface of the tank and the lining, said oxidation of the systemic toxin resulting in loss of the central carbon atom through production of a benzedrine derivative and said systemic toxin becomes colorless to indicate such corrosion.

8. In a fuel tank or container, a lining on the interior thereof comprising a polymeric material selected from the group consisting of polyurethane and Buna-N, and a systemic toxic selected from the group consisting of brilliant green and malachite green, said systemic toxin contained within the polymeric material and being in an amount sufficient to be effective for inhibiting the penetration of micro-organisms through the lining.

9. In a fuel tank or container, a lining on the interior thereof comprising a polymeric material selected from the group consisting of polyurethane and Buna-N, and a systemic toxin selected from the group consisting of brilliant green and malachite green, said systemic toxin contained within the polymeric material and being in an amount sufficient to be effective for inhibiting corrosion on the inner surface of the tank.

10. In a fuel tank or container, a lining on the interior thereof comprising a polymeric material selected from the group consisting of polyurethane and Buna-N, and a systemic toxin selected from the group consisting of brilliant green and malachite green, said systemic toxin contained within the polymeric material and being in an amount sufficient to be effective to result in oxidation of the systemic toxin upon the presence of corrosion on the inner surface of the tank, said oxidation of the systemic toxin resulting in loss of the central carbon atom through production of a benzedrine derivative and said systemic toxin becomes colorless to indicate such corrosion.

11. In a fuel tank of a turbine powered aircraft, a lining on the interior thereof comprising a polymeric material selected from the group consisting of polyurethane and Buna-N, and a systemic toxin selected from the group consisting of brilliant green and malachite green, said systemic toxin being uniformly distributed throughout the polymeric material and being in an amount sufficient to be effective for inhibiting the penetration of micro-organisms through the lining.

12. In a metal container for receiving and storing turbine fuels and the like which may contain incidental amounts of water and micro-organisms which subsist on the water and fuel and attack the metal surfaces of the containers, a coating for said container comprising a polymeric plastic and a non-colorless water soluble systemic toxin in said plastic, said systemic toxin in an amount sufficient to inhibit penetration of said coating by said micro-organisms.

13. A coated metal surface comprising a polymerized plastic applied to said metal surface, said applied plastic material incorporating an acid additive salt of rosaniline in which at least one substitute ethylamine group contains the cation of the salt in an amount to reduce microbial penetration of the coating.

14. A process for impregnating a polymerized coating with a systemic toxin of an acid additive salt of rosaniline in which at least one substitute ethylamine group contains the cation of the salt comprising the steps of placing a solution of the systemic toxin having a solvent compatible to the polymerized coating material in contact with the polymerized coating followed by the removal of the systemic toxin solvent.

15. A process for impregnating a polymerized coating with a systemic toxin comprising the steps of placing a solution of the systemic toxin having a solvent compatible to the polymerized coating material in contact with the polymerized coating for a minimum period substantially in the order of ten minutes, and removal of the systemic toxin solvent.

16. The process as called for in claim 15 wherein the removal of the systemic toxin solvent is accomplished by evaporation drying of the solvent.

17. The process as called for in claim 16 wherein the removal of the systemic toxin of an acid additive salt of rosaniline in which at least one substitute ethylamine group contains the cation of the salt solvent is accomplished by washing of the polymerized coating.

References Cited
UNITED STATES PATENTS

| | | | |
|---|---|---|---|
| 2,876,155 | 3/1959 | Howard et al. | 167—14 |
| 3,169,071 | 2/1965 | Hochman et al. | 106—15 X |
| 3,199,990 | 8/1965 | Taylor | 106—15 |
| 3,259,478 | 7/1966 | Thayer | 167—31 X |
| 3,279,986 | 10/1966 | Hyman | 167—42 |
| 3,308,082 | 3/1967 | Pauli et al. | |

OTHER REFERENCES

Canadian Paint and Varnish Mag., June 1951, pp. 24, 26, 50 and 51.

McGregor, Materials Protection, June 1963, pp. 24, 25, 26 and 28.

RALPH S. KENDALL, *Primary Examiner.*

U.S. Cl. X.R.

106—14, 15; 117—97, 132, 161; 167—330; 260—45.9; 220—64; 244—135